(12) United States Patent
Moriya

(10) Patent No.: US 11,770,488 B2
(45) Date of Patent: Sep. 26, 2023

(54) IMAGE PROCESSING APPARATUS, METHOD FOR CONTROLLING IMAGE PROCESSING APPARATUS, AND STORAGE MEDIUM CAPABLE OF PREVENTING RECURRENCE OF JAM AT TIME OF DOCUMENT READING BY DISPLAYING NOTIFICATION TO USE A DIFFERENT READING METHOD

(71) Applicant: CANON KABUSHIKI KAISHA, Tokyo (JP)

(72) Inventor: Akihiro Moriya, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/849,966

(22) Filed: Jun. 27, 2022

(65) Prior Publication Data
US 2023/0024576 A1    Jan. 26, 2023

(30) Foreign Application Priority Data
Jul. 15, 2021    (JP) .................................. 2021-117355

(51) Int. Cl.
*H04N 1/00* (2006.01)
*G06F 3/12* (2006.01)

(52) U.S. Cl.
CPC ..... *H04N 1/00766* (2013.01); *H04N 1/00615* (2013.01); *H04N 1/00801* (2013.01)

(58) Field of Classification Search
CPC ........... H04N 1/00615; H04N 1/00766; H04N 1/00801
USPC ........................ 358/1.11–1.18, 400–404, 474
See application file for complete search history.

(56) References Cited

U.S. PATENT DOCUMENTS

| | | | |
|---|---|---|---|
| 9,609,156 B2 | 3/2017 | Ono | |
| 9,832,323 B2* | 11/2017 | Koda | H04N 1/00721 |
| 2005/0238205 A1* | 10/2005 | Kimura | G06V 10/98 382/309 |
| 2014/0036279 A1* | 2/2014 | Tohki | H04N 1/00456 358/1.2 |

(Continued)

FOREIGN PATENT DOCUMENTS

JP    2016071605 A    5/2016

*Primary Examiner* — Chad Dickerson
(74) *Attorney, Agent, or Firm* — ROSSI, KIMMS & McDOWELL LLP

(57) ABSTRACT

An image processing apparatus capable of preventing recurrence of a jam at the time of document reading is provided. The image processing apparatus includes a feeder, a reader, a storage device, and a processor. The processor causes the image processing apparatus to function as: a reading unit configured to cause the reader to read a document by a reading method among a plurality of reading methods including a conveyance-based reading method using the feeder; a storage control unit configured to, in a case where reading of a document with the reader by the conveyance-based reading method has failed, store information on the document in the storage device; and a notification unit configured to, in a case where an instruction to read again the document by the conveyance-based reading method is issued, issue, in accordance with the information, a notification that prompts to change the reading method set for the document.

6 Claims, 16 Drawing Sheets

(56) References Cited

U.S. PATENT DOCUMENTS

2015/0215481 A1* 7/2015 Faust ................. H04N 1/32122
358/1.13

* cited by examiner

FIG. 8A
801
[PATIENT ID]_[DOCUMENT TYPE]_[TIME]_[SET NUMBER].pdf
FIG. 8B
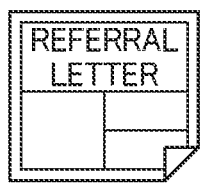
802
[12345]_[ REFERRAL LETTER]_[20200728152130]_[1111].pdf
803
[12345]_[MEDICAL QUESTIONNAIRE]_[20200728152135]_[1111].pdf
804
[12345]_[INSURANCE CARD]_[20200728152140]_[1111].pdf

*FIG. 9*

ELECTRONIC MEDICAL RECORD SYSTEM

PATIENT INFORMATION

123

JOHN SMITH

| BODY TEMPERATURE | BLOOD PRESSURE | BLOOD TYPE | WEIGHT | HEIGHT | |
|---|---|---|---|---|---|

| WORK TYPE | WORK NAME | DOCUMENT TYPE | TIME | DISPLAY | PERSON IN CHARGE |
|---|---|---|---|---|---|
| OUTPATIENT | RECEPTION OF INITIAL EXAMINATION | REFERRAL LETTER | 20200728 | DISPLAY | |
| | | MEDICAL QUESTIONNAIRE | 20200728 | DISPLAY | |
| | | INSURANCE CARD | 20200728 | DISPLAY | |
| HOSPITAL-IZATION | HOSPITAL-IZATION PROCEDURE | | | | |

*FIG. 11*

| PATIENT ID | DOCUMENT SET INFORMATION | DOCUMENT TYPE | READING RESULT |
|---|---|---|---|
| 123 | SET FOR INITIAL EXAMINATION | REFERRAL LETTER | OK |
| | | MEDICAL QUESTIONNAIRE | NG (ADF JAM) |
| | | INSURANCE CARD | OK |
| ... | | | |

1100, 1101, 1102, 1103, 1104

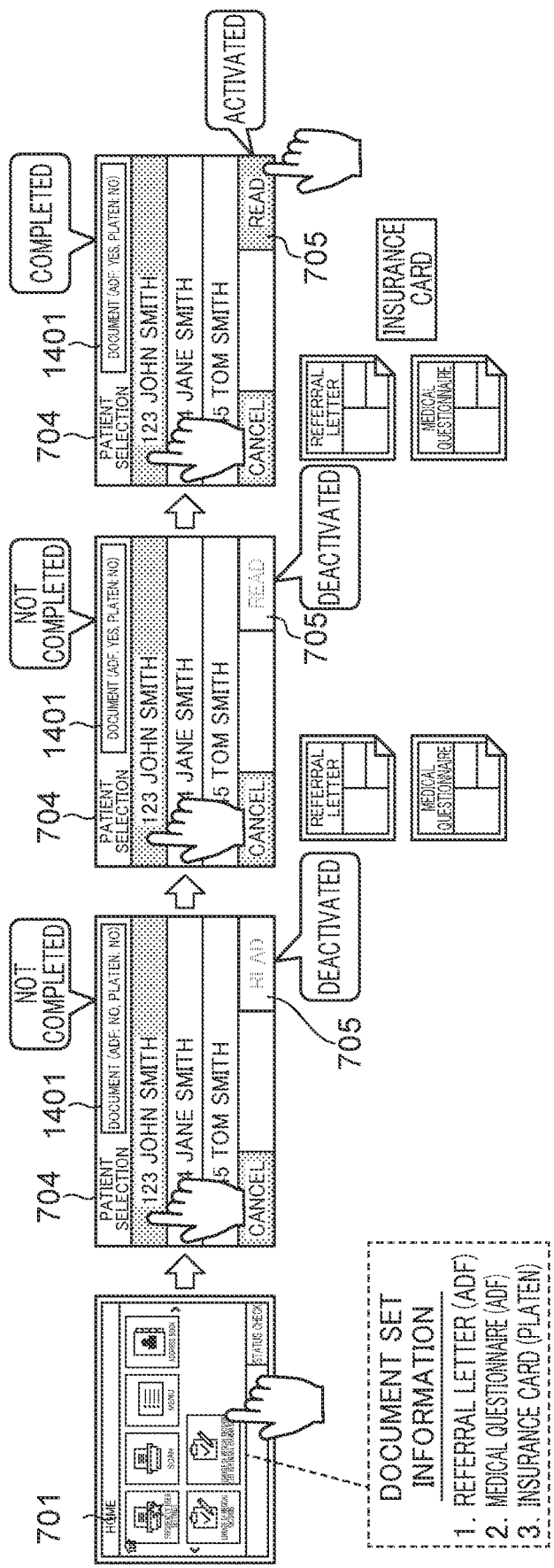

IMAGE PROCESSING APPARATUS, METHOD FOR CONTROLLING IMAGE PROCESSING APPARATUS, AND STORAGE MEDIUM CAPABLE OF PREVENTING RECURRENCE OF JAM AT TIME OF DOCUMENT READING BY DISPLAYING NOTIFICATION TO USE A DIFFERENT READING METHOD

This application claims the benefit of Japanese Patent Application No. 2021-117355, filed on Jul. 15, 2021, which is hereby incorporated by reference herein in its entirety.

BACKGROUND OF THE INVENTION

Field of the Invention

The present invention relates to image processing apparatuses, methods for controlling the image processing apparatus, and storage media.

Description of the Related Art

Electronic medical record systems that manage patient information are known. In an electronic medical record system, diagnostic images such as X-ray photographs of patients are registered in association with respective patient IDs assigned to corresponding patients. Furthermore, in an electronic medical record system, pieces of image data, which are obtained by converting documents submitted by patients into electronic data, are also registered in association with corresponding patient IDs. As a method for preparing image data of documents submitted by patients, a method using an image processing apparatus having a scanner function is commonly known.

In a hospital, at the time of reception of an examination, a plurality of types of documents are submitted by a patient, where examples of the documents include a medical questionnaire, a health insurance card (hereinafter, it is simply referred to as an "insurance card"), and a referral letter from another hospital, which are different in document size, material, weight, and the like. When preparing image data of each of these documents using an image processing apparatus, a medical clerical staff needs to configure scan settings for each type of document on the image processing apparatus. Examples of the scan settings include a plurality of items such as a reading method setting, a reading side setting, a color mode setting, and a resolution setting, where the reading method setting indicates either a method of reading a document conveyed from an automatic document feeder (ADF) or a method of reading a document placed on a platen, and the reading side setting indicates a side or sides of a document to be read. It is time-consuming for a medical clerical staff who processes information of a large number of patients to configure these scan settings for each patient. Concerning it, image processing apparatuses capable of registering scan settings have been developed. When a shortcut button is pressed, such an image processing apparatus performs scan processing in accordance with scan settings associated with the shortcut button (see Japanese Laid-Open Patent Publication (kokai) No. 2016-71605). It reduces the time and effort required for settings configured when pieces of image data of the documents are prepared.

The condition of documents submitted by a patient depends on their keeping until immediately before the submission. For example, when a document with a fold is put on an ADF of an image processing apparatus and is submitted to scanning, it may result in a jam or a paper jam that occurs in the image processing apparatus. An occurrence of such a jam worsens the condition of the document. After the jam has been resolved, a medical clerical staff may put the document on the ADF again and give a reading instruction as in the previous time without being conscious of the condition of the document, which will result in recurrence of the jam in the image processing apparatus.

SUMMARY OF THE INVENTION

The present invention provides image processing apparatuses, methods for controlling the image processing apparatus and storage media, capable of preventing recurrence of a jam at the time of document reading.

Accordingly, the present invention provides an image processing apparatus comprising: a feeder capable of conveying a plurality of documents placed thereon; a reader configured to read a document; a storage device; and one or more processors. The one or more processors cause the image processing apparatus to function as a reading unit configured to cause the reader to read a document by a reading method set among a plurality of reading methods including a conveyance-based reading method of reading a document conveyed from the feeder. The processor further causes the image processing apparatus to function as a storage control unit configured to, in a case where reading of a document with the reader by the conveyance-based reading method has failed, store information on the document in the storage device. The processor further causes the image processing apparatus to function as a notification unit configured to, in a case where an instruction to read again the document, of which the reading has failed, by the conveyance-based reading method is issued, issue, in accordance with the information, a notification that prompts to change the reading method set for the document.

Further features of the present invention will become apparent from the following description of exemplary embodiments (with reference to the attached drawings).

BRIEF DESCRIPTION OF THE DRAWINGS

FIGS. 8A to 8C are diagrams for describing file names of image data transmitted to a file storage by the image processing apparatus of FIG. 1.

FIG. 9 is a diagram illustrating an example of a screen of registered images displayed on the display of the electronic medical record management apparatus of FIG. 2.

FIG. 11 is a diagram illustrating an example of a reading result table stored in RAM of FIG. 1.

FIG. 14 is a diagram illustrating an example of an operation of registering image data using document-set information.

DESCRIPTION OF THE EMBODIMENTS

Figure 1:
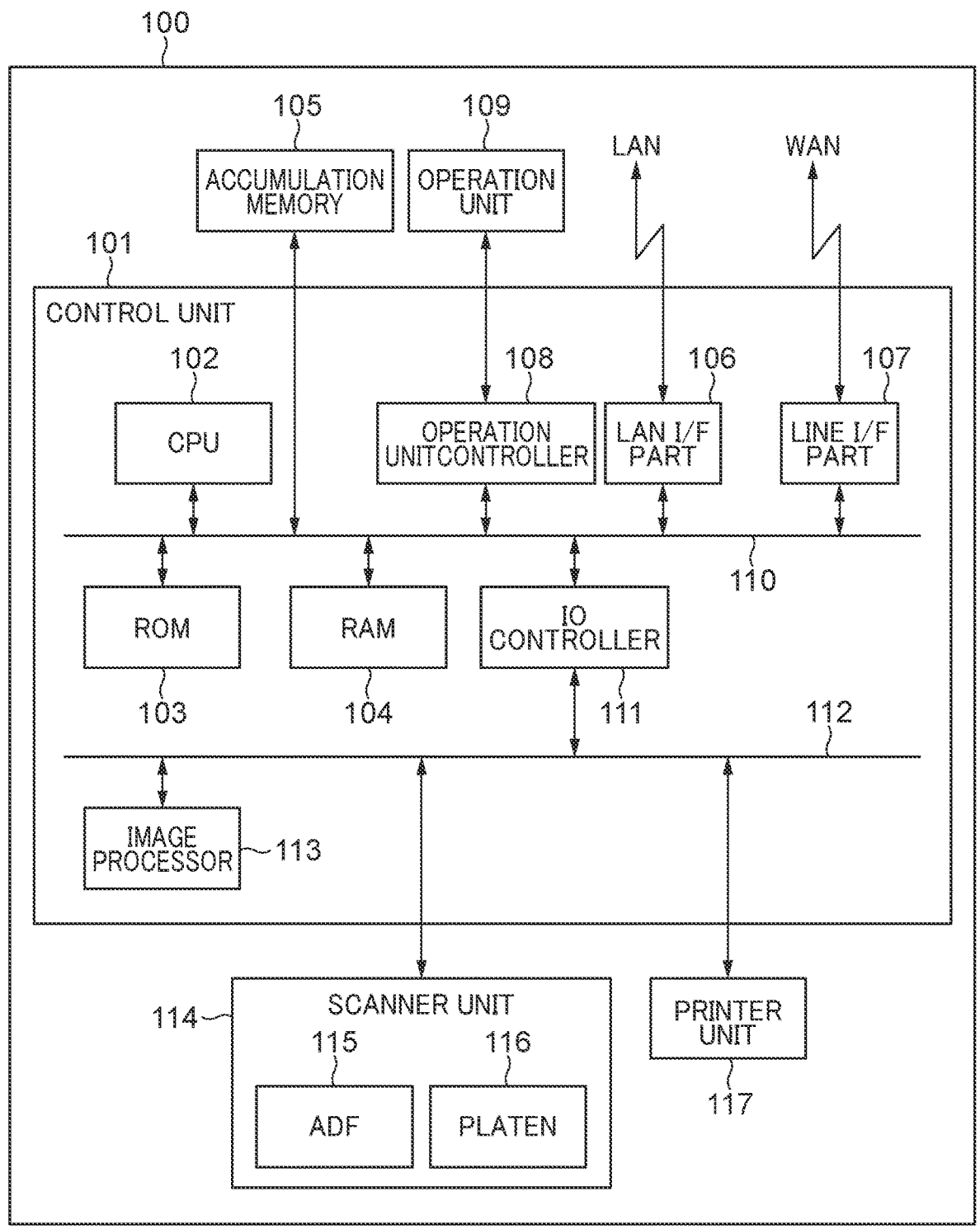
FIG. 1 is a block diagram schematically illustrating a hardware configuration of an image processing apparatus according to an embodiment of the present invention.

The present invention will now be described in detail below with reference to the accompanying drawings showing embodiments thereof FIG. 1 is a block diagram schematically illustrating a hardware configuration of an image processing apparatus 100 according to an embodiment of the present invention.

In FIG. 1, the image processing apparatus 100 includes a control unit 101, an accumulation memory 105, an operation unit 109, a scanner unit 114, and a printer unit 117. The control unit 101 is connected to the accumulation memory 105, the operation unit 109, the scanner unit 114, and the printer unit 117. The control unit 101 includes a CPU 102, a ROM 103, a RAM 104, a LAN I/F part 106, a line I/F part 107, an operation unit controller 108, an IO controller 111, and an image processor 113.

The CPU 102 is configured to execute programs stored in the ROM 103 or the accumulation memory 105 to perform various controls. The ROM 103 stores a system boot program. The RAM 104 is a system work memory area for the CPU 102 to execute software programs and is used as an image memory for temporary storage in processing image data. The accumulation memory 105 is a storage medium such as an HDD, a solid-state drive (SSD), or an embedded multimedia card (eMMC), and is used as an internal storage of the image processing apparatus 100. For example, the accumulation memory 105 stores image data of a document generated by the scanner unit 114 reading the document, programs, and the like.

The LAN I/F part 106 is an I/F part for connection with a LAN, and is configured to transmit and receive data to and from devices connected to the LAN. The line I/F part 107 is an I/F part for connection with a WAN, and is configured to transmit and receive data to and from devices connected to the WAN.

The operation unit controller 108 is configured to output, to the operation unit 109, a VGA signal for displaying an image on the operation unit 109. The operation unit controller 108 is further configured to transfer, to the CPU 102, information input by a user through the operation unit 109. The operation unit 109 is a user interface that is configured to accept a user's operation and present information to a user, and includes a display including an LCD touch panel or the like, a keypad device, and a card reader device. The operation unit 109 is configured to interpret the VGA signal acquired from the operation unit controller 108 and displays images on the display. The CPU 102, the ROM 103, the RAM 104, the LAN I/F part 106, the line I/F part 107, and the operation unit controller 108 are connected to each other via a system bus 110. In addition, the IO controller 111 is also connected to the system bus 110. The IO controller 111 is a bus bridge that connects the system bus 110 and an image bus 112 and is configured to convert a data structure of the system bus 110.

The image bus 112 is capable of transferring image data at a high speed, and includes a general-purpose bus such as a PCI bus, IEEE1394, and PCIEx. The image processor 113, the scanner unit 114, and the printer unit 117 are connected to the image bus 112. The image bus 112 is configured to perform synchronous/asynchronous conversion of image data.

The image processor 113 includes a plurality of ASICs that is configured to perform image processing such as resolution conversion, compression/expansion, and binary multi-level conversion on the acquired image data. The scanner unit 114 includes a reading part, an ADF 115, and a platen 116, and is configured to optically read a document conveyed from the ADF 115 or a document set on the platen 116 by the reading part to generate image data. The scanner unit 114 is further configured to transmit the image data to the image processor 113. Specifically, the platen is a component for use in reading of a document placed on a platen glass prepared in the scanner unit, through which a document can be read by the reading part without being conveyed. The ADF 115 is capable of successively conveying a plurality of documents to the reading part of the scanner unit 114, but is not capable of successively conveying documents of a plurality of types, which have different document sizes, materials, weights, and the like. For this reason, the platen 116 is used to read documents of a plurality of types, which have different document sizes, materials, weights, and the like. It should be noted that, in the present embodiment, in a case where the scanner unit 114 uses the ADF 115 to perform a scan processing on documents that the ADF 115 cannot convey and an ADF jam actually occurs, the scan process ends. The printer unit 117 is configured to print an image on a sheet based on image data subjected to image processing by the image processor 113.

Figure 2:
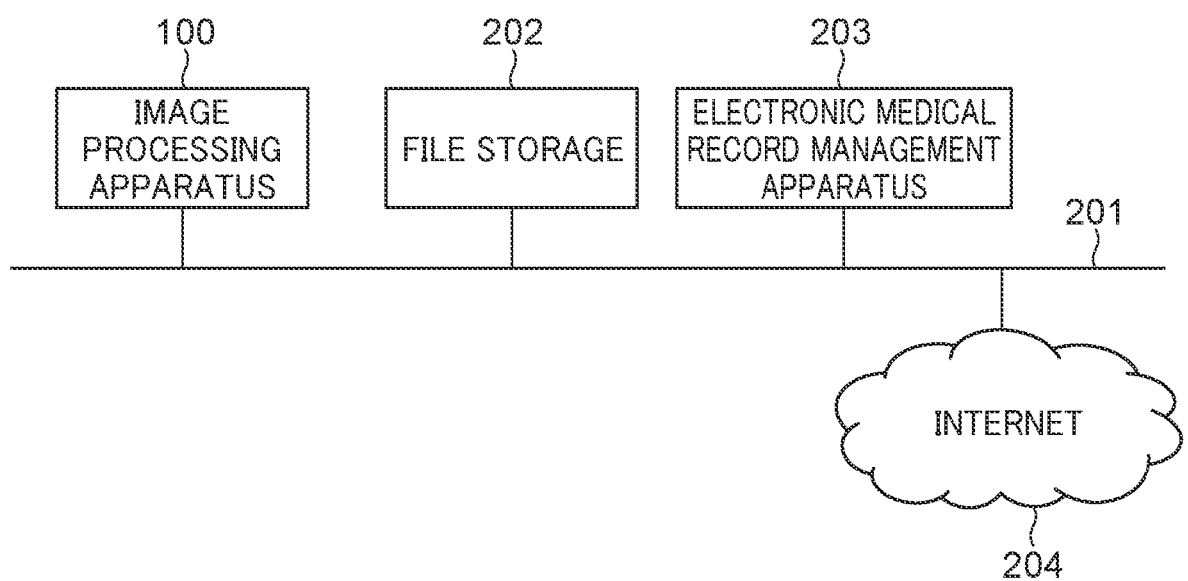
FIG. 2 is a network configuration diagram of an electronic medical record system including the image processing apparatus of FIG. 1.

FIG. 2 is a network configuration diagram of an electronic medical record system including the image processing apparatus 100 of FIG. 1. The electronic medical record system is configured to manage patient information. As illustrated in FIG. 2, the electronic medical record system includes the image processing apparatus 100, a file storage 202, and an electronic medical record management apparatus 203. The image processing apparatus 100 is communicably connected to the file storage 202 and the electronic medical record management apparatus 203 via a network 201. The network 201 is also connected to the Internet 204. The image processing apparatus 100 is configured to read, for example, an insurance card, a medical questionnaire, and a referral letter from another hospital, generate image data of them, and transmit the generated image data to the file storage 202. The image data is, for example, image data in a PDF format or image data in an image format such as TIFF and JPEG.

The file storage 202 stores image data transmitted from the image processing apparatus 100. The electronic medical record management apparatus 203 is configured to periodically take in the image data stored in the file storage 202, and registers the taken image data in association with corresponding patient IDs assigned to respective patients. It should be noted that the present embodiment assumes that the file storage 202 and the electronic medical record management apparatus 203 are separate devices, but the present invention is not limited to this; the file storage 202 and the electronic medical record management apparatus 203 may be given as a single device having both functions. Furthermore, the file storage 202 and the electronic medical record management apparatus 203 may be configured to be communicable with the image processing apparatus 100 via the Internet 204 instead of the network 201.

Figure 3:
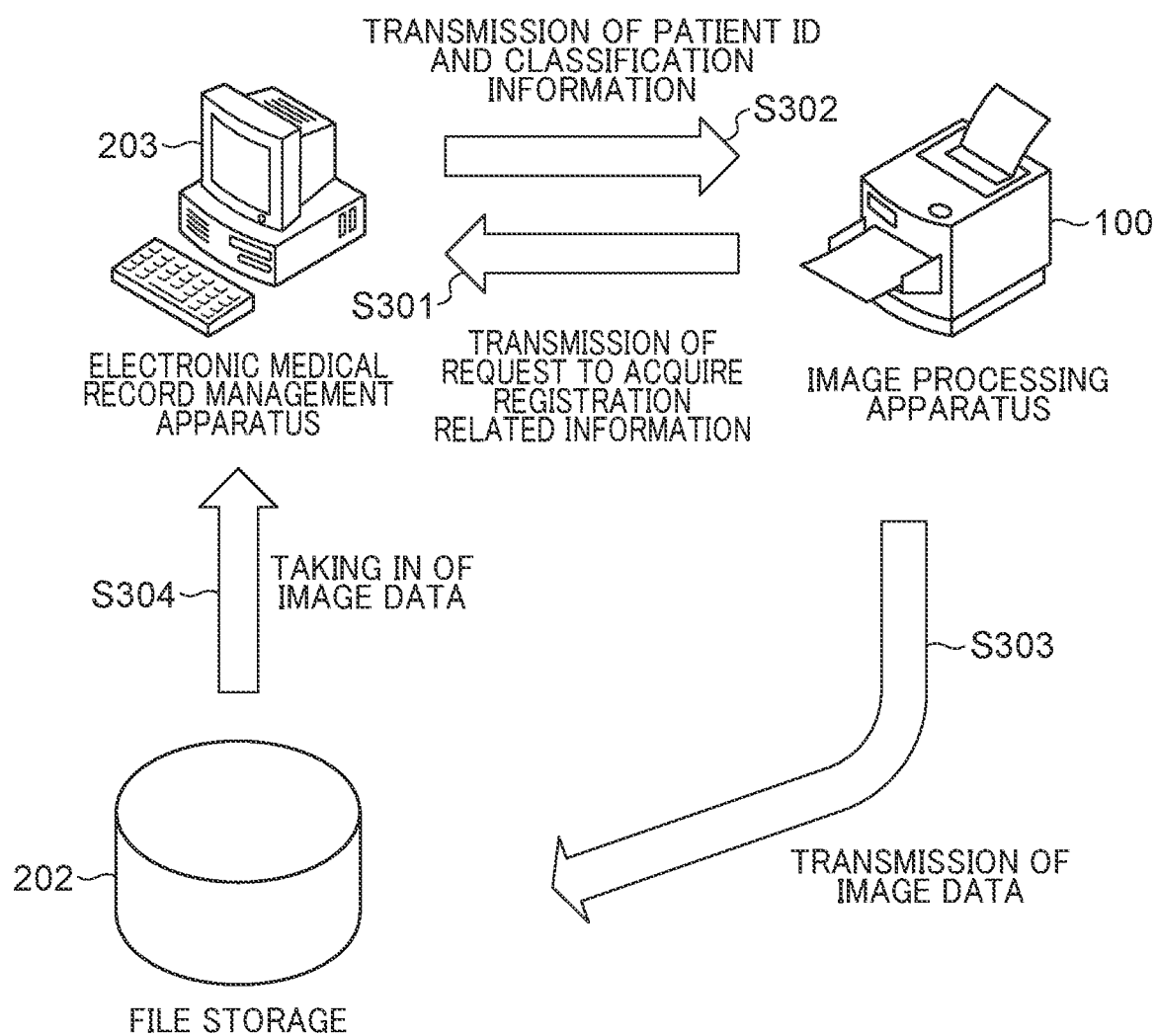
FIG. 3 is a diagram for explaining communication of the electronic medical record system according to the present embodiment.

FIG. 3 is a diagram for explaining communication of the electronic medical record system according to the present embodiment.

As illustrated in FIG. 3, when receiving an instruction to execute processing using the linkage function of the electronic medical record system from a user, the image processing apparatus 100 transmits, to the electronic medical record management apparatus 203, a request to acquire registration related information necessary for registration of image data (step S301). According to the received acquisition request, the electronic medical record management apparatus 203 transmits the registration related information, specifically, the patient ID and the classification information indicating the type of image data to be registered to the image processing apparatus 100 (step S302). Next, using the scanner unit 114, the image processing apparatus 100 reads documents corresponding to the classification information, for example, a medical questionnaire, an insurance card, and a referral letter, generates image data of them, and transmits the generated image data to the file storage 202 (step S303). The file storage 202 stores the received image data. The electronic medical record management apparatus 203 takes in the image data stored in the file storage 202 (step S304). In step S304, the electronic medical record management apparatus 203 acquires image data from the file storage 202, and stores the acquired image data in the storage device of the electronic medical record management apparatus 203 in association with the corresponding patient ID transmitted in step S302. Alternatively, the electronic medical record management apparatus 203 may acquire no image data from the file storage 202, and obtain the file path indicating the storage location of the image data stored in the file storage 202 to register the file path in association with the corresponding patient ID transmitted in step S302, in the database managed by the electronic medical record management apparatus 203. It should be noted that the electronic medical record management apparatus 203 may determine whether or not image data has been added into the file storage 202 at regular time intervals, and execute the process of step S304 in a case where image data has been added into the file storage 202. The electronic medical record management apparatus 203 may execute the process of step S304 according to an instruction received from a user. When the process of step S304 is completed, it allows a user to view the registered image data through a screen 400 of registered images (registered image screen) illustrated in FIG. 4.

Figure 4:
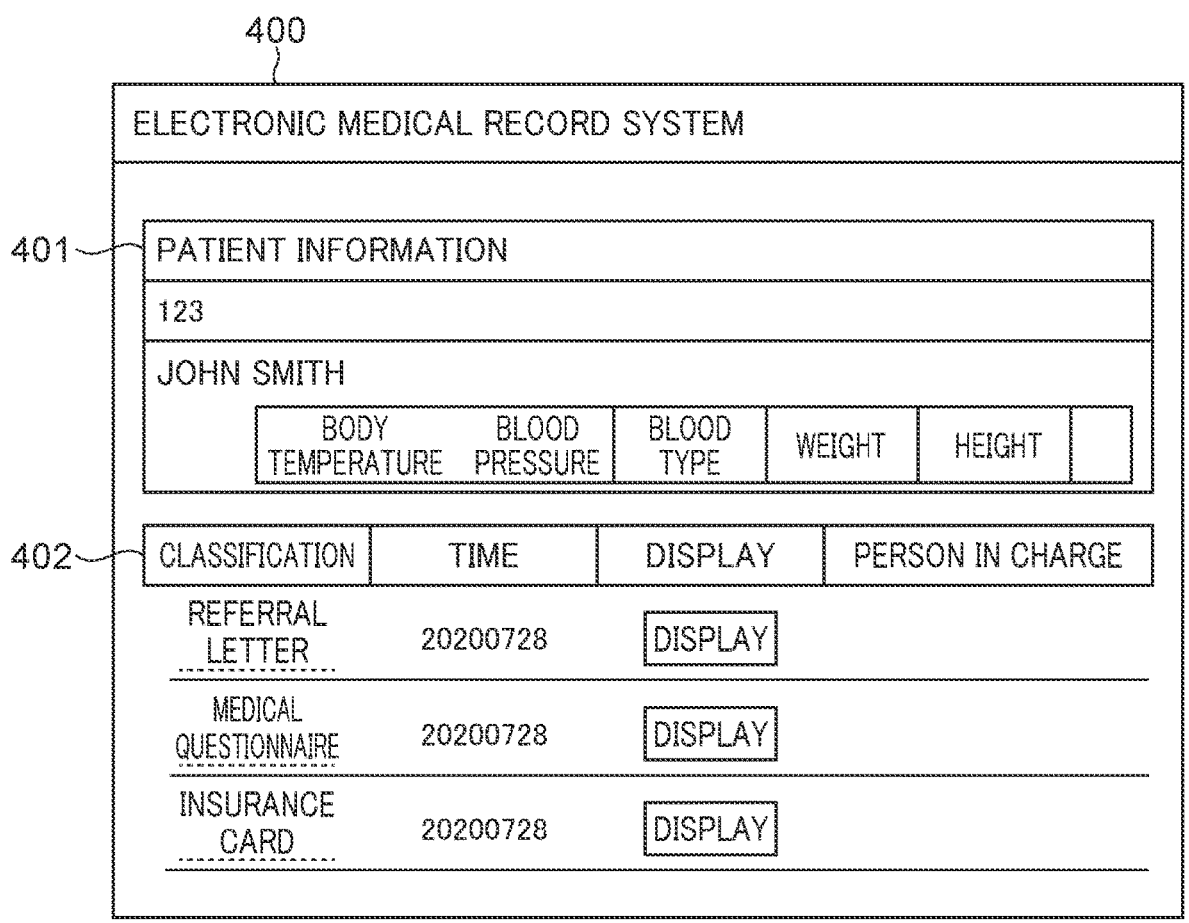
FIG. 4 is a diagram illustrating an example of a screen of registered images displayed on a display of an electronic medical record management apparatus of FIG. 2.

FIG. 4 is a diagram illustrating an example of the registered image screen 400 displayed on a display of the electronic medical record management apparatus 203 of FIG. 2.

The registered image screen 400 presents a list of image data registered in association with the corresponding patient ID of a certain patient. The registered image screen 400 includes patient information 401 and an image list 402. The patient information 401 includes the patient ID, and the body temperature, blood pressure, blood type, weight, and height of the patient. As the image list 402, a list of pieces of image data registered in association with the patient ID displayed as the patient information 401 is displayed. It should be noted that the image list 402 includes the image data of types indicated by the classification information transmitted by the electronic medical record management apparatus 203 in step S302. When a user selects a piece of image data from the image list 402, the selected image data is displayed on the display of the electronic medical record management apparatus 203.

Next, a description is given of an operation for registering image data in the electronic medical record management apparatus 203 (hereinafter, referred to as "operation of registering image data").

Figure 5:
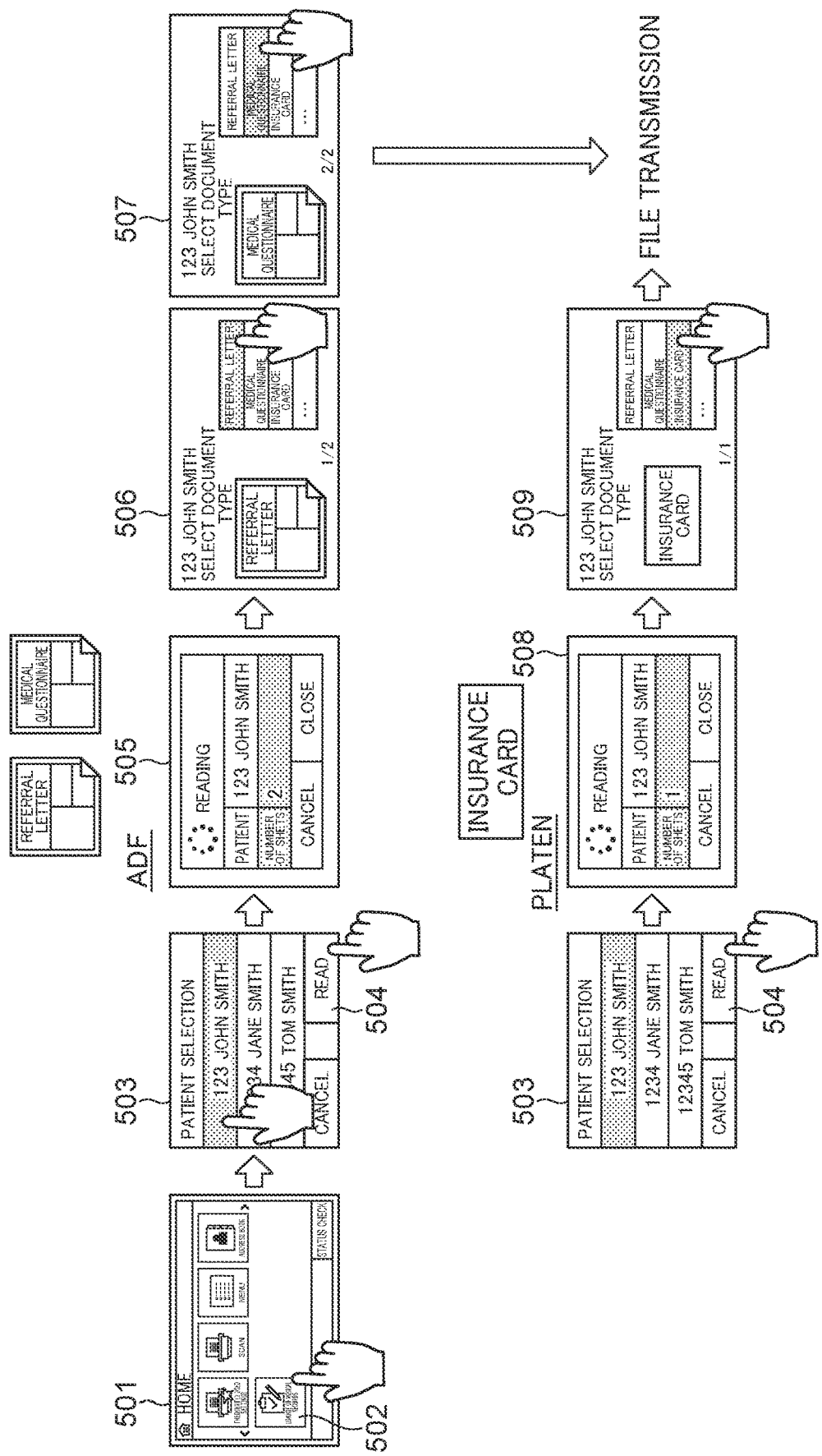
FIG. 5 is a diagram illustrating an example of a conventional operation of registering image data.

FIG. 5 is a diagram illustrating an example of a conventional operation of registering image data. With reference to FIG. 5, a description is given of an example of a case that image data of a medical questionnaire, a referral letter, and an insurance card (hereinafter, referred to as "a set for an initial examination") is registered. It should be noted that a medical questionnaire and a referral letter have the same document size, material, and weight, while an insurance card differs from the medical questionnaire and the referral letter in document size, material, and weight.

As illustrated in FIG. 5, the operation unit 109 of the image processing apparatus 100 displays a home screen 501 including a plurality of icons corresponding to respective functions of the image processing apparatus 100. An icon 502 indicated in the home screen 501 is an operation button that allows a user to give an instruction to execute processing using the linkage function of the electronic medical record system. When a user selects the icon 502, the operation unit 109 then displays a patient selection screen 503. The patient selection screen 503 shows a list of patient IDs and patient names. With the patient selection screen 503 being displayed on the operation unit 109, the user sets a referral letter and a medical questionnaire on the ADF 115 of the scanner unit 114, selects a patient from the patient selection screen 503, and presses a reading start button 504 in the patient selection screen 503. When the reading start button 504 is pressed, the ADF 115 conveys the referral letter and the medical questionnaire set on the ADF 115 to a reading part of the scanner unit 114, and the reading part starts reading the referral letter and the medical questionnaire. During the reading, the operation unit 109 displays a reading screen 505. When the reading part completes the reading, the operation unit 109 displays document type selection screens 506 and 507, which allow a user to set the referral letter and the medical questionnaire as the types of the read document in the respective displayed screens. When the setting of the document types is completed, the image processor 113 generates image data for transmission from the image data generated by the scanner unit 114. The image data for transmission is transmitted to the file storage 202 through the LAN I/F part 106 and the line I/F part 107.

Next, with the patient selection screen 503 being displayed on the operation unit 109, the user sets an insurance card on the platen 116 of the scanner unit 114, selects a patient from the patient selection screen 503, and presses a reading start button 504 in the patient selection screen 503. When the reading start button 504 is pressed, the reading part of the scanner unit 114 starts reading the insurance card set on the platen 116. During the reading, the operation unit 109 displays a reading screen 508. When the reading part completes the reading, the operation unit 109 displays a document type selection screen 509, which allows a user to set the insurance card as the type of the read document in the document type selection screen 509. When the setting of the document type is completed, the image processor 113 generates image data for transmission from the image data generated by the scanner unit 114. The image data for transmission is transmitted to the file storage 202 through the LAN I/F part 106 and the line I/F part 107.

As described above, conventionally, when image data of a plurality of types of documents having different document sizes, materials, weights, and the like is registered, it is necessary to perform registration operation many times for each document size, material, weight, and the like, which needs time and effort.

On the other hand, in the present embodiment, an operation of registering image data of a document set is collectively performed in accordance with information on the document set (document-set information) registered in advance, where the document set includes a plurality of types of documents having different document sizes, materials, weights, and the like. The document-set information includes reading settings for documents included in the document set. Examples of the reading setting include a reading method setting which indicates "ADF" (conveyance-based reading method) or "platen" (platen-based reading method), a reading side setting which indicates "one side" or "both sides" to be read, a sheet number setting which indicates the number of sheets of the document, a color mode setting, a resolution setting, and a file format setting. The document-set information is registered in advance at the time of factory shipment of the image processing apparatus 100, for example. It should be noted that, in the present embodiment, a user is allowed to newly register the document-set information in the image processing apparatus 100. A user is also allowed to change the document-set information registered in the image processing apparatus 100.

Figure 6:
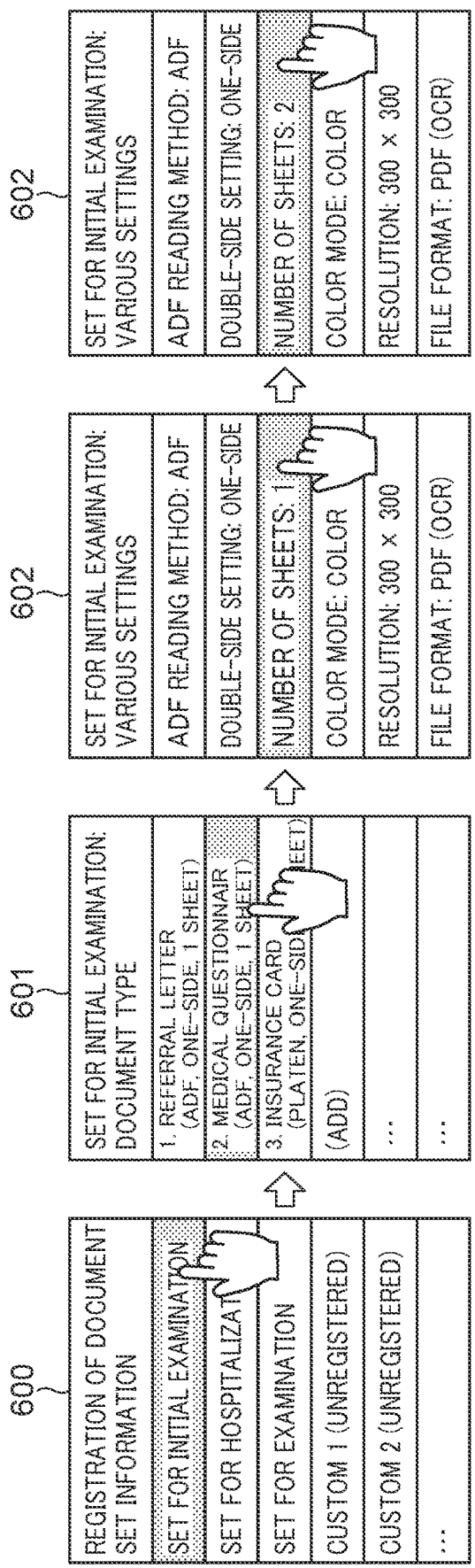
FIG. 6 is a diagram illustrating an example of an operation of registering document-set information according to the present embodiment.

For example, when a user selects "selection of document-set information" from a setting menu (which is not illustrated) displayed on the operation unit 109, the operation unit 109 then displays a screen 600 of FIG. 6. The screen 600 shows a list of document sets for which document-set information has been registered in advance. When a user selects one of the document sets, for example, a set for an initial examination, in the screen 600, the operation unit 109 then displays a screen 601. The screen 601 indicates the reading order of documents included in the set for an initial examination. FIG. 6 illustrates an example of the reading order such that the first in the reading order is a referral letter, the second is a medical questionnaire, and the third is an insurance card. The screen 601 also indicates reading settings for each document. When a user selects one of the documents, for example, "medical questionnaire", in the screen 601, the operation unit 109 then displays a screen 602. The screen 602 allows a user to change the reading settings for the medical questionnaire. For example, when a user changes the number of sheets of the document, which has been set to "one" in advance, to "two" in the screen 602, as illustrated in FIG. 6, the number of document sheets in the reading setting for the medical questionnaire is updated to "two". It should be noted that, in a case where the "platen" has been set as the reading method, the reading part may read the document over the entire surface of the platen or may read the document in a predetermined section of the readable area on the platen. For example, in a case where the readable area on the platen is A3 size, the readable area may be divided into A4 size sections, and the image processing apparatus 100 may be configured to allow a user to designate a section to be read among the A4 size sections.

As described above, in the present embodiment, document-set information corresponding to routine works is registered in the image processing apparatus 100 in advance, so as to make the operation of registering image data of a document set easy and so as to customize settings related to reading of document sets according to every hospital's work style.

Figure 7:
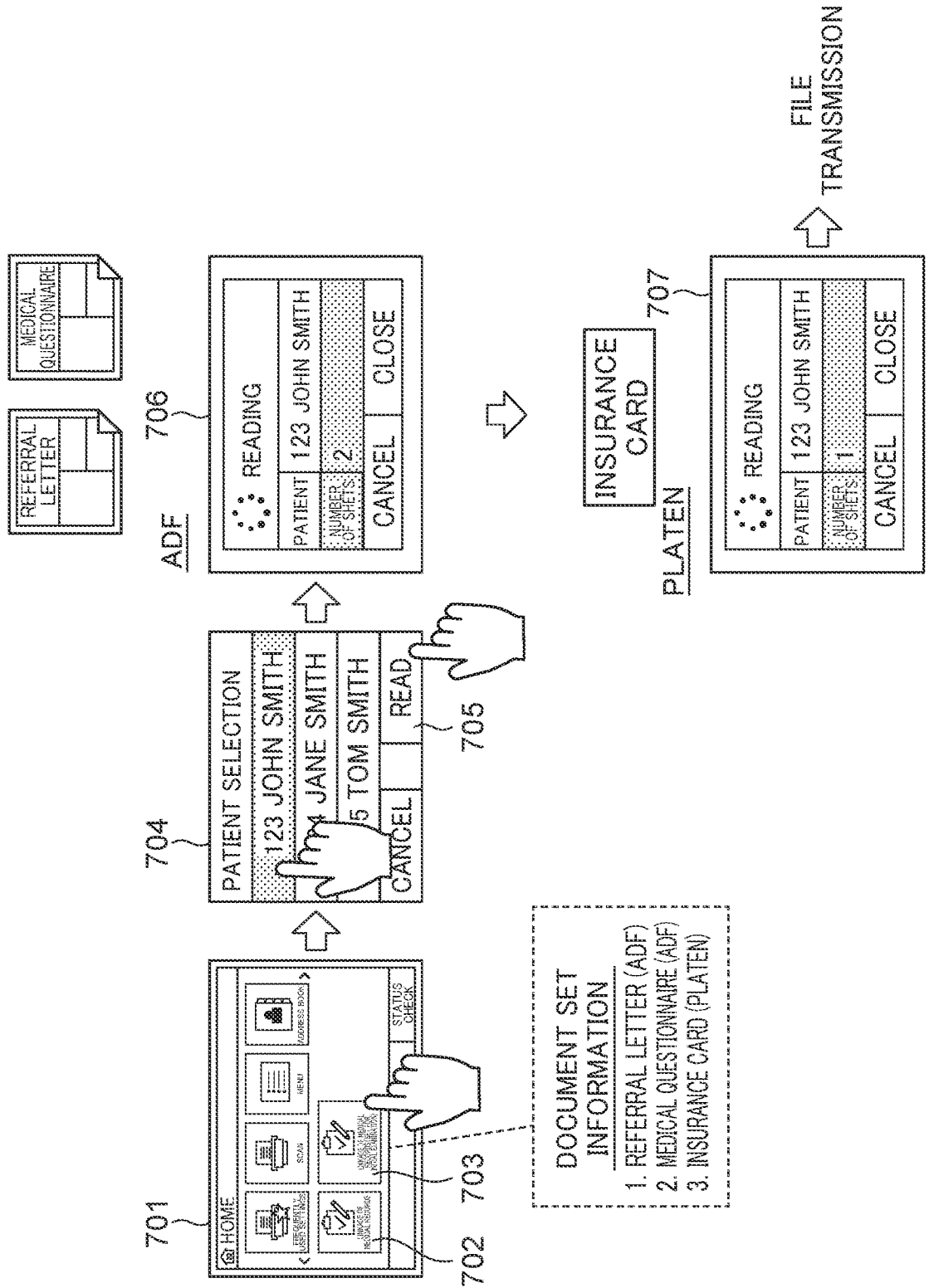
FIG. 7 is a diagram illustrating an example of an operation of registering image data using the document-set information.

FIG. 7 is a diagram illustrating an example of an operation of registering image data using the document-set information. Also in FIG. 7, as in FIG. 5, a description is given of an example of a case that image data of a set for an initial examination is registered. It should be noted that, in FIG. 7, as in FIG. 5, a medical questionnaire and a referral letter have the same document size, material, and weight, while an insurance card differs from the medical questionnaire and the referral letter in document size, material, and weight.

As illustrated in FIG. 7, the operation unit 109 of the image processing apparatus 100 displays a home screen 701 including a plurality of icons corresponding to the respective functions of the image processing apparatus 100. The home screen 701 includes an icon 703 along with an icon 702 having the same function as the icon 502 described above. The icon 703 is an operation button that allows a user to give an instruction to execute processing using the linkage function of the electronic medical record system, which is associated with the document-set information for the set for an initial examination described above. When a user selects the icon 703, the operation unit 109 then displays a patient selection screen 704. With the patient selection screen 704 being displayed on the operation unit 109, the user sets the referral letter and the medical questionnaire on the ADF 115 of the scanner unit 114 and sets the insurance card on the platen 116, and the user then selects a patient from the patient selection screen 704, and presses a reading start button 705 in the patient selection screen 704. Here, the reading start button 705 works as an instruction unit that allows a user to input an instruction to read all of the document(s) placed on the ADF 115 and the documents placed on the platen 116. When the reading start button 705 is pressed, the ADF 115 conveys the set referral letter and the medical questionnaire to a reading part of the scanner unit 114, and the reading part starts reading the referral letter and the medical questionnaire. During the reading, the operation unit 109 displays a reading screen 706. When the reading of the documents set on the ADF 115 is completed, the reading part of the scanner unit 114 starts reading the insurance card set on the platen 116. During the reading, the operation unit 109 displays a reading screen 707. When the reading part completes the reading of the insurance card, the image processor 113 generates image data for transmission from the image data generated by the scanner unit 114. The image data for transmission is transmitted to the file storage 202 through the LAN I/F part 106 and the line I/F part 107, and the file storage 202 stores the received image data. The image data stored in the file storage 202 is taken into the electronic medical record management apparatus 203 in step S304 described above.

Here, when registering the image data taken from the file storage 202, the electronic medical record management apparatus 203 determines the patient ID and the document type from the file name of the taken image data. For this purpose, in the present embodiment, the image processing apparatus 100 adds information (see a file name format 801 illustrated in FIG. 8A) including the patient ID, the document type and the reading time of a document to the file name of the image data for transmission, and transmits the image data to the file storage 202. The electronic medical record management apparatus 203 determines the patient ID and the document type from the file name of the image data taken from the file storage 202, so that the electronic medical record management apparatus 203 can classify the image data by patient ID and/or document type and store it in an appropriate folder in the file system in the electronic medical record management apparatus 203. Furthermore, the image processing apparatus 100 (CPU 102) adds an identifier (for example, a set number) of the document-set information to the file name of the image data for transmission. As a result, the electronic medical record management apparatus 203 can determine whether some document files have been generated in the same routine work, and can collectively store the document files in the same folder when storing the document files in the file system in the electronic medical record management apparatus 203, facilitating document management.

Figure 8C:
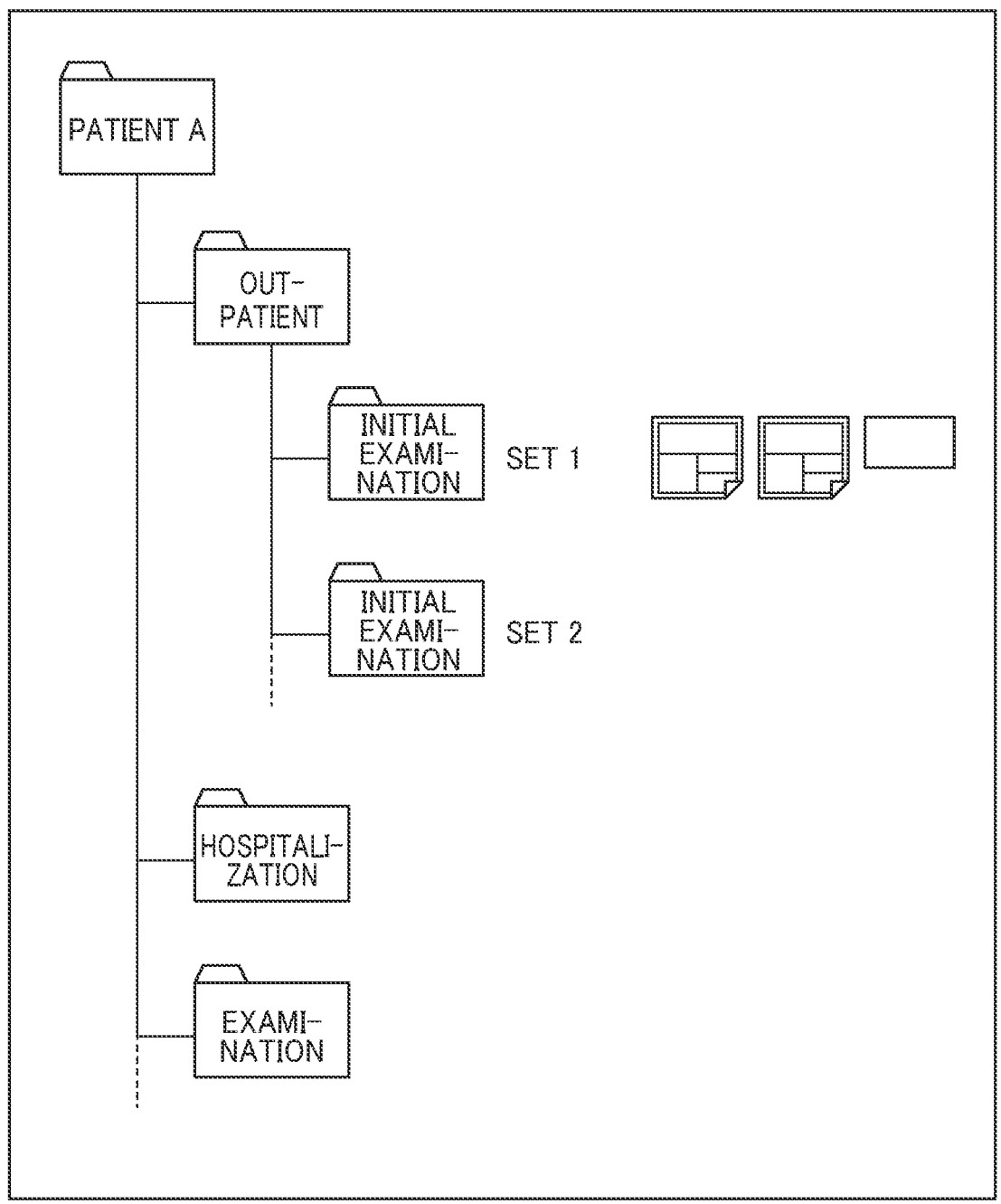

The file name format 801 includes a patient ID, a document type, a time indicating time when a document was read, and a set number corresponding to an identifier of document-set information. For example, the file of the image data of the referral letter is named as shown in 802 of FIG. 8B, the file of the image data of the medical questionnaire sheet is named as shown in 803 of FIG. 8B, and the file of the image data of the insurance card is named as shown in 804 of FIG. 8B. As illustrated in FIG. 8C, the pieces of image data are stored in the same folder (for example, the "initial examination set 1" folder) of the file system in the electronic medical record management apparatus 203. The image data registered in this manner can be browsed through a registered image screen 900 in FIG. 9. The registered image screen 900 has the same configuration as the registered image screen 400, and the registered image screen 900 indicates that the pieces of image data of the referral letter, the medical questionnaire, and the insurance card are collectively registered at the time of a reception of an initial examination.

As described above, in the present embodiment, the medical clerical staff can register pieces of image data of documents of a plurality of types having different document sizes, materials, weights, and the like by a simple operation of placing the documents on the ADF 115 and/or the platen 116, selecting the icon 703 associated with the document-set information, and selecting a patient to be registered.

It should be noted that, in a hospital, at the time of a reception of an examination, a patient submits a plurality of types of documents, such as a medical questionnaire, an insurance card, and a referral letter from another hospital, which are different in document size, material, weight, and the like. The condition of documents submitted by a patient depends on their keeping until immediately before the submission. For example, when a document with a fold is put on an ADF 115 and is submitted to scanning, it may result in a jam or a paper jam. An occurrence of such a jam worsens the condition of the document. After the jam has been resolved, a medical clerical staff may put the document on the ADF 115 again and give a reading instruction as in the previous time without being conscious of the condition of the document, which will result in recurrence of the jam.

Figure 13:
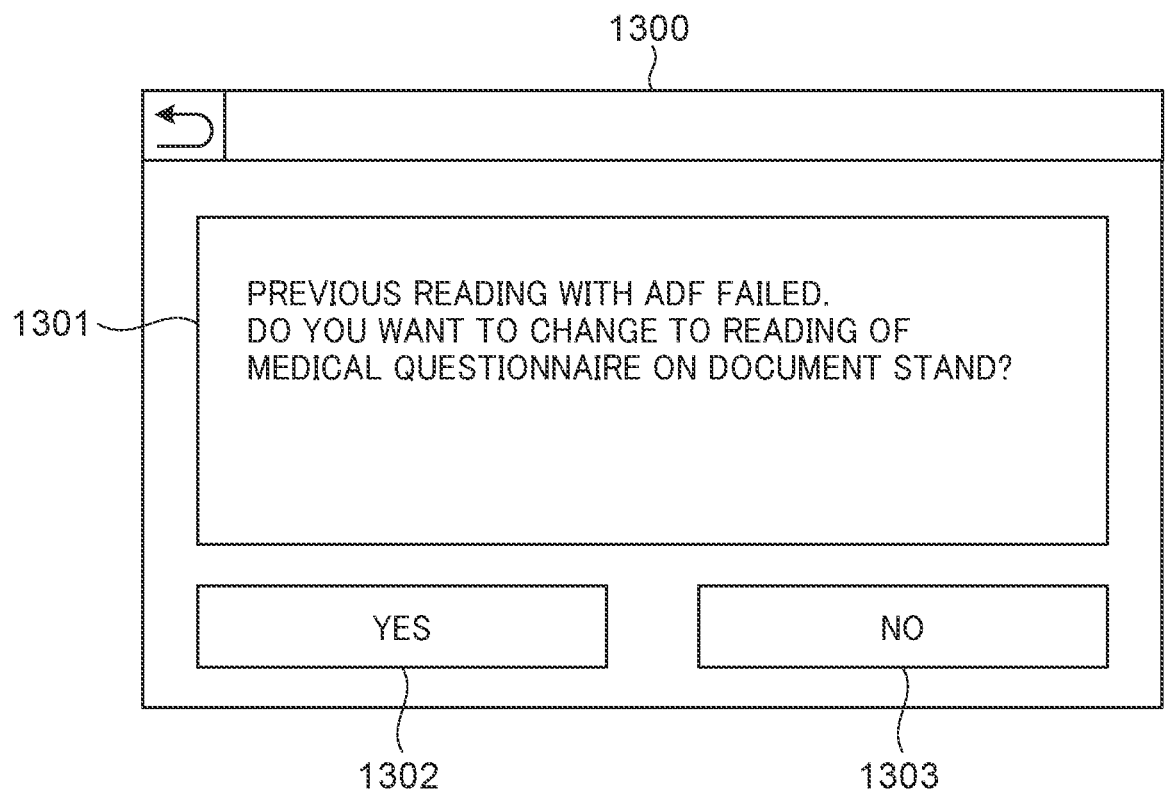
FIG. 13 is a diagram illustrating an example of a change notification screen displayed on an operation unit in FIG. 1.

On the other hand, in the present embodiment, in a case where the image processing apparatus 100 receives an instruction to read again a document, of which the reading with the ADF 115 has failed, the operation unit 109 displays a change notification screen 1300 that prompts a user to change the reading method set for the document as illustrated in FIG. 13, which will be described later.

Figure 10A:
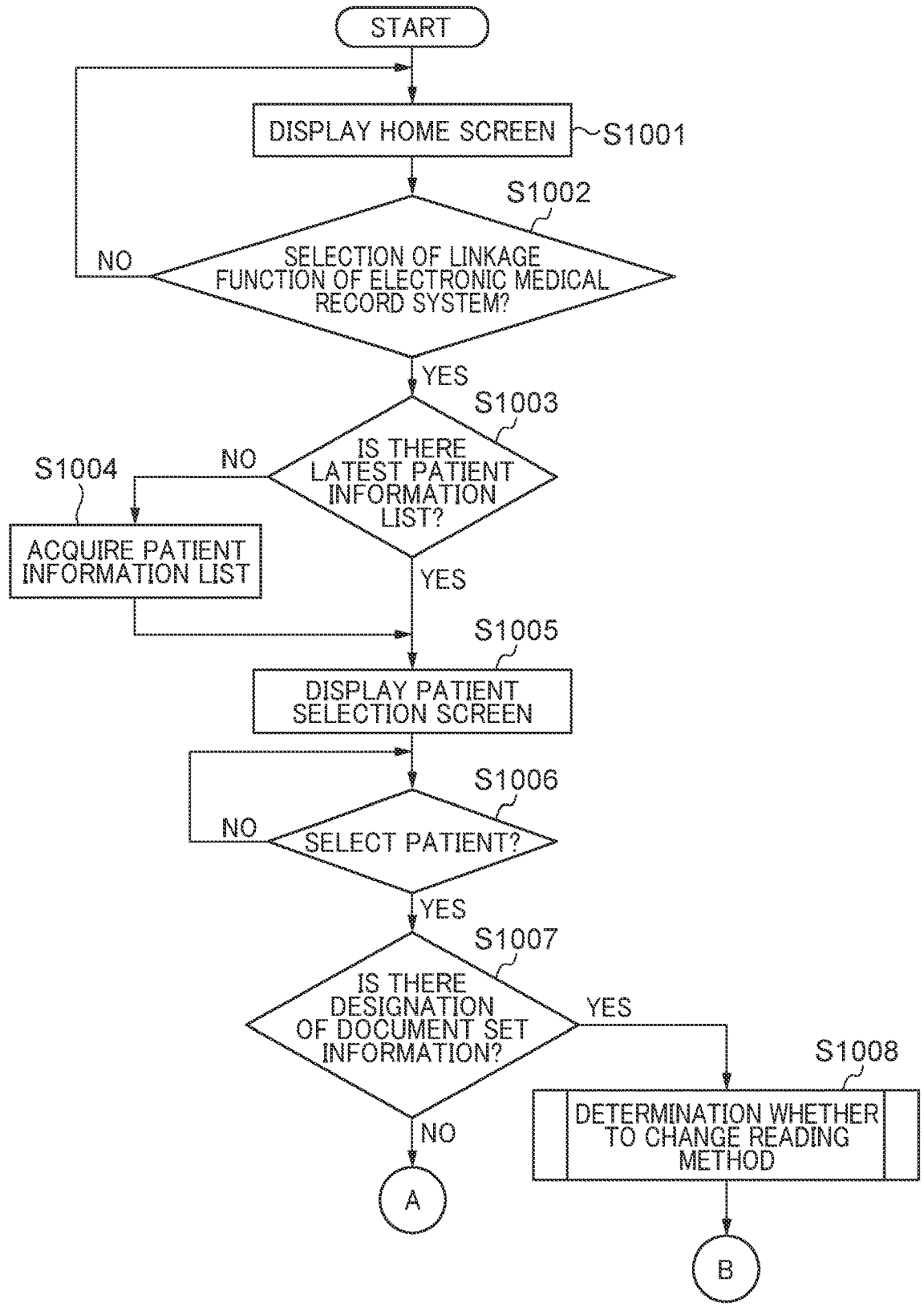
FIGS. 10A and 10B are flowcharts illustrating a procedure of a reading control process for a document set executed by the image processing apparatus of FIG. 1.
Figure 10B:
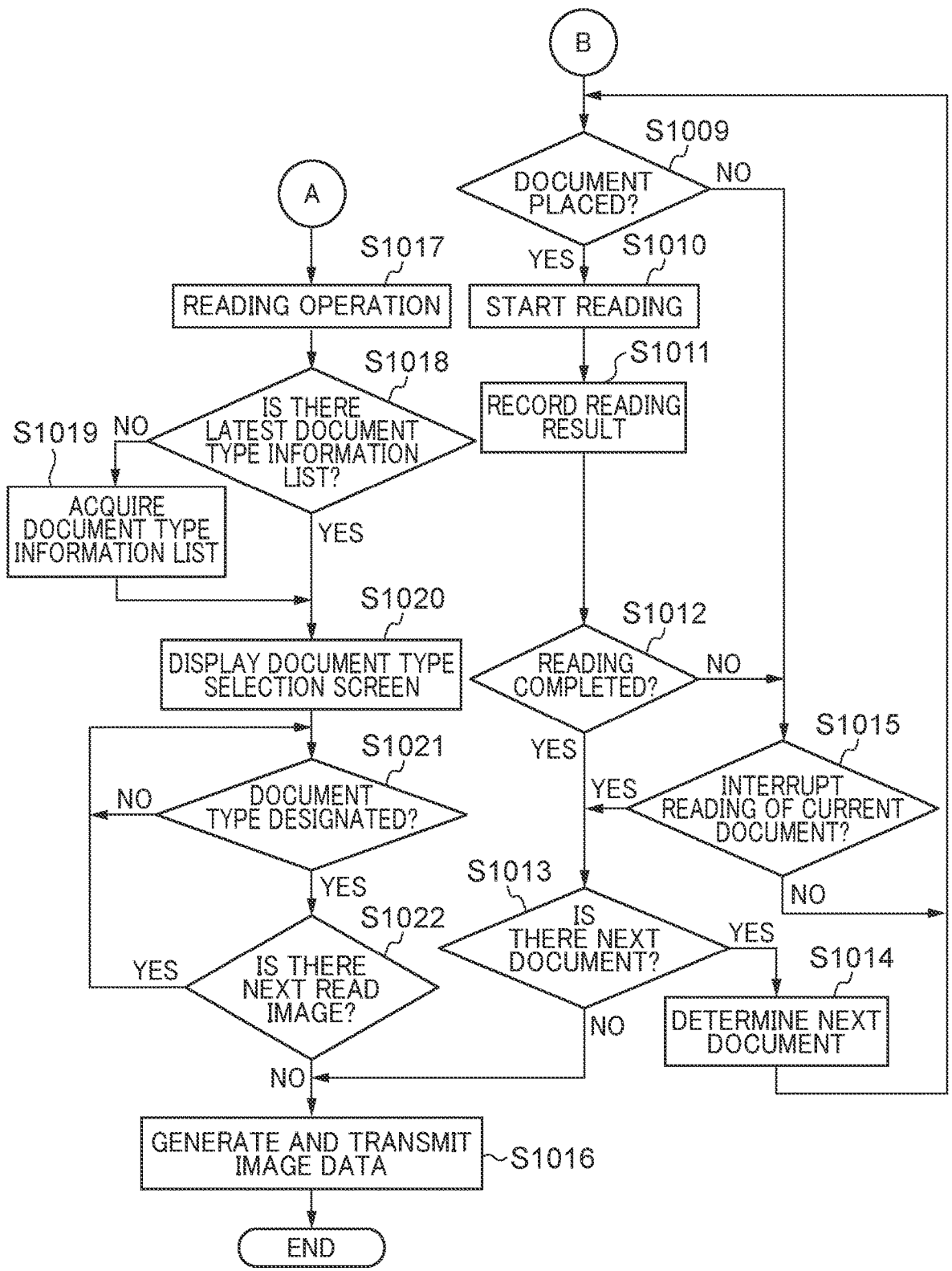

FIGS. 10A and 10B are flowcharts illustrating a procedure of a reading control process for a document set, which is executed by the image processing apparatus 100 of FIG. 1.

The reading control process for a document set in FIGS. 10A and 10B is implemented by the CPU 102 executing a program stored in the ROM 103 or the accumulation memory 105.

In the procedure illustrated in FIGS. 10A and 10B, the CPU 102 causes the operation unit 109 to display the home screen 701 including the icon 702 and the icon 703 (step S1001). Next, the CPU 102 determines whether or not a user has selected the linkage function of the electronic medical record system (step S1002). In step S1002, for example, in a case where an operation button for giving an instruction to execute processing using the linkage function of the electronic medical record system (e.g., the icon 702 or the icon 703) has been selected by the user, the CPU 102 determines that the user has selected the linkage function of the electronic medical record system. On the other hand, in a case where the operation button for giving an instruction to execute processing using the linkage function of the electronic medical record system described above has not been selected, the CPU 102 determines that the user has not selected the linkage function of the electronic medical record system.

As a result of the determination in step S1002, in a case where the user has not selected the linkage function of the electronic medical record system, the reading control processing for a document set returns to step S1001. As a result of the determination in step S1002, in a case where the user has selected the linkage function of the electronic medical record system, the CPU 102 determines whether or not the latest patient information list is stored in the RAM 104 (step S1003). The patient information list is list information of patient IDs and names of patients registered in advance in the electronic medical record management apparatus 203, and is managed by the electronic medical record management apparatus 203. In step S1003, for example, in a case where the patient information list acquired within a predetermined time period is stored in the RAM 104, the CPU 102 determines that the latest patient information list is stored in the RAM 104. On the other hand, in a case where the patient information list acquired within the predetermined time period is not stored in the RAM 104, the CPU 102 determines that the latest patient information list is not stored in the RAM 104.

As a result of the determination in step S1003, in a case where the latest patient information list of the electronic medical record management apparatus 203 is stored in the RAM 104, the reading control process for a document set proceeds to step S1005 which will be described later. As a result of the determination in step S1003, in a case where the latest patient information list of the electronic medical record management apparatus 203 is not stored in the RAM 104, the CPU 102 acquires the patient information list from the electronic medical record management apparatus 203 (step S1004). The CPU 102 then causes the operation unit 109 to display the patient selection screen 704 based on the patient information list (step S1005). Next, when detecting that the user has selected a patient from the patient selection screen 704 and has pressed the reading start button 705 in the patient selection screen 704 (YES in step S1006), the CPU 102 determines whether or not there is designation of document-set information (step S1007). In step S1007, for example, in a case where the icon selected by the user in step S1002 is an icon associated with the document-set information, like the icon 703 associated with the document-set information for the set for an initial examination, the CPU 102 determines that there is designation of document-set information. On the other hand, in a case where the icon selected by the user in step S1002 is an icon that is not associated with the document-set information, like the icon 702, the CPU 102 determines that there is no designation of document set information.

As a result of the determination in step S1007, in a case where there is designation of document-set information, the CPU 102 performs the process of determination whether to change the reading method illustrated in FIG. 12, which will be described later (step S1008), and issues a notification that prompts a user to change the reading method set in the document-set information as necessary. Next, the CPU 102 refers to the designated document-set information, determines a document of which reading order is set first in the document-set information, and checks the reading method set for the determined document. The CPU 102 uses a sensor of the scanner unit 114 to determine whether or not a document is set in a document placement location (the ADF 115 or the platen 116) corresponding to the reading method set for the determined document (step S1009). As an example, a description is given of a case where the document-set information for a set for an initial examination is designated, and the reading order of the documents is the order of the referral letter, the medical questionnaire, and the insurance card. In this case, the CPU 102 checks that the reading method for a referral letter, which is set to the first reading order, is "ADF", and determines whether or not a document is on the ADF 115.

As a result of the determination in step S1009, in a case where a document is in the document placement location corresponding to the set reading method, the CPU 102 starts reading the document in the document placement location (step S1010). For example, in accordance with "ADF" being the reading method setting for a referral letter, which is set to the first reading order, the CPU 102 starts reading the referral letter in the ADF 115. Next, the CPU 102 records a reading result in a reading result table 1100 illustrated in FIG. 11 (step S1011).

The reading result table 1100 is stored in the RAM 104. The reading result table 1100 is a table for managing reading results, and includes areas of patient ID 1101, document-set information 1102, document type 1103, and reading result 1104. The patient ID of the patient selected in step S1006 is recorded in the area of patient ID 1101. In the area of document-set information 1102, the name of the document set corresponding to the designated document-set information is recorded. In the area of document type 1103, the document types included in the designated document-set information are recorded. The reading result is recorded in the area of reading result 1104, which is started in step S1011. For example, in a case where the above reading (reading of a document on the ADF 115) is successful, "OK" is recorded in the area of reading result 1104 for the document. On the other hand, in a case where an ADF jam occurs at the time of reading the document and the reading fails, "NG (ADF jam)" is recorded in the area of reading result 1104 for the document, where "NG" means failure of the reading.

Next, the CPU 102 checks the number of sheets of the determined document in the designated document-set information, and determines whether or not the reading of the designated number of sheets has been completed (step S1012).

As a result of the determination in step S1012, in a case where the reading of the designated number of sheets has been completed, the CPU 102 determines whether or not a document next to the determined document in the reading order is set in the document-set information (step S1013).

As a result of the determination in step S1013, in a case where the document to be read next to the determined document is set in the document-set information, the CPU 102 determines the document to be read next to the determined document (step S1014), and returns to step S1009.

In a case where no document is set as a result of the determination in step S1009 or in a case where the reading of the designated number of sheets is not completed as a result of the determination in step S1012, the CPU 102 determines whether or not to interrupt the reading of the determined document (step S1015). The determination in step S1015 may be performed according to preset information, or may be performed according to an instruction received from a user.

As a result of the determination in step S1015, in a case where the reading of the determined document is determined to be interrupted, the reading control process for a document set proceeds to step S1013. As a result of the determination in step S1015, in a case where the reading of the determined document is determined not to be interrupted, the reading control process for a document set returns to step S1009, and the CPU 102 determines whether or not the document is in the document placement location corresponding to the set reading method. As described above, in the present embodiment, for example, when the icon 703 associated with the document-set information about the set of an initial examination is selected, the referral letter and the medical questionnaire set on the ADF 115, and the insurance card set on the platen 116 are read in this order.

As a result of the determination in step S1013, in a case where a document to be read next to the determined documents is not in the document-set information, the reading control process for a document set proceeds to step S1016. In step S1016, the CPU 102 controls the image processor 113 to generate image data for transmission based on the image data generated by the scanner unit 114, and transmits the image data for transmission to the file storage 202 through the LAN I/F part 106 or the line I/F part 107. After that, the CPU 102 ends this processing. It should be noted that, in the present embodiment, the configuration has been described in which the CPU 102 transmits the image data for which the reading has been completed to the file storage 202 even in a case where the number of sheets subjected to the reading is insufficient. However, the present invention is not limited to this configuration, and for example, the CPU 102 may the job may be in a case where the number of sheets is insufficient.

As a result of the determination in step S1007, in a case where there is no designation of the document-set information, the CPU 102 reads a document or documents on the ADF 115 or the platen 116 (step S1017). Next, the CPU 102 determines whether or not the latest document type information list is stored in the RAM 104 (step S1018). The document type information list is list information of documents registered in advance in the electronic medical record management apparatus 203, such as a referral letter, a medical questionnaire, and an insurance card, and is managed by the electronic medical record management apparatus 203. In step S1018, for example, in a case where the document type information list acquired within a predetermined time period is stored in the RAM 104, the CPU 102 determines that the latest document type information list is stored in the RAM 104. On the other hand, in a case where the document type information list acquired within the predetermined time period is not stored in the RAM 104, the CPU 102 determines that the latest document type information list is not stored in the RAM 104.

As a result of the determination in step S1018, in a case where the latest document type information list is stored in the RAM 104, the control process for a document set proceeds to step S1020, which will be described later. As a result of the determination in step S1018, in a case where the latest document type information list is not stored in the RAM 104, the CPU 102 acquires the document type information list from the electronic medical record management apparatus 203 (step S1019). Next, the CPU 102 causes the operation unit 109 to display a document type selection screen, for example, the document type selection screen 506 based on the document type information list and the image data generated by the scanner unit 114 (step S1020). Next, when detecting that the user has set a document type in the document type selection screen 506 (YES in step S1021), the CPU 102 determines whether or not there is a next read image (step S1022).

As a result of the determination in step S1022, in a case where there is a next read image, the reading control process for a document set returns to step S1021, which will be described later, and the CPU 102 causes the operation unit 109 to display a document type selection screen corresponding to the next read image. As a result of the determination in step S1022, in a case where there is no next read image, the reading control process for a document set proceeds to step S1016, which will be described later, and CPU 102 controls the image processor 113 to generate image data for transmission based on the image data generated by the scanner unit 114, and transmits the image data for transmission to the file storage 202 through the LAN I/F part 106 or the line I/F part 107.

Figure 12:
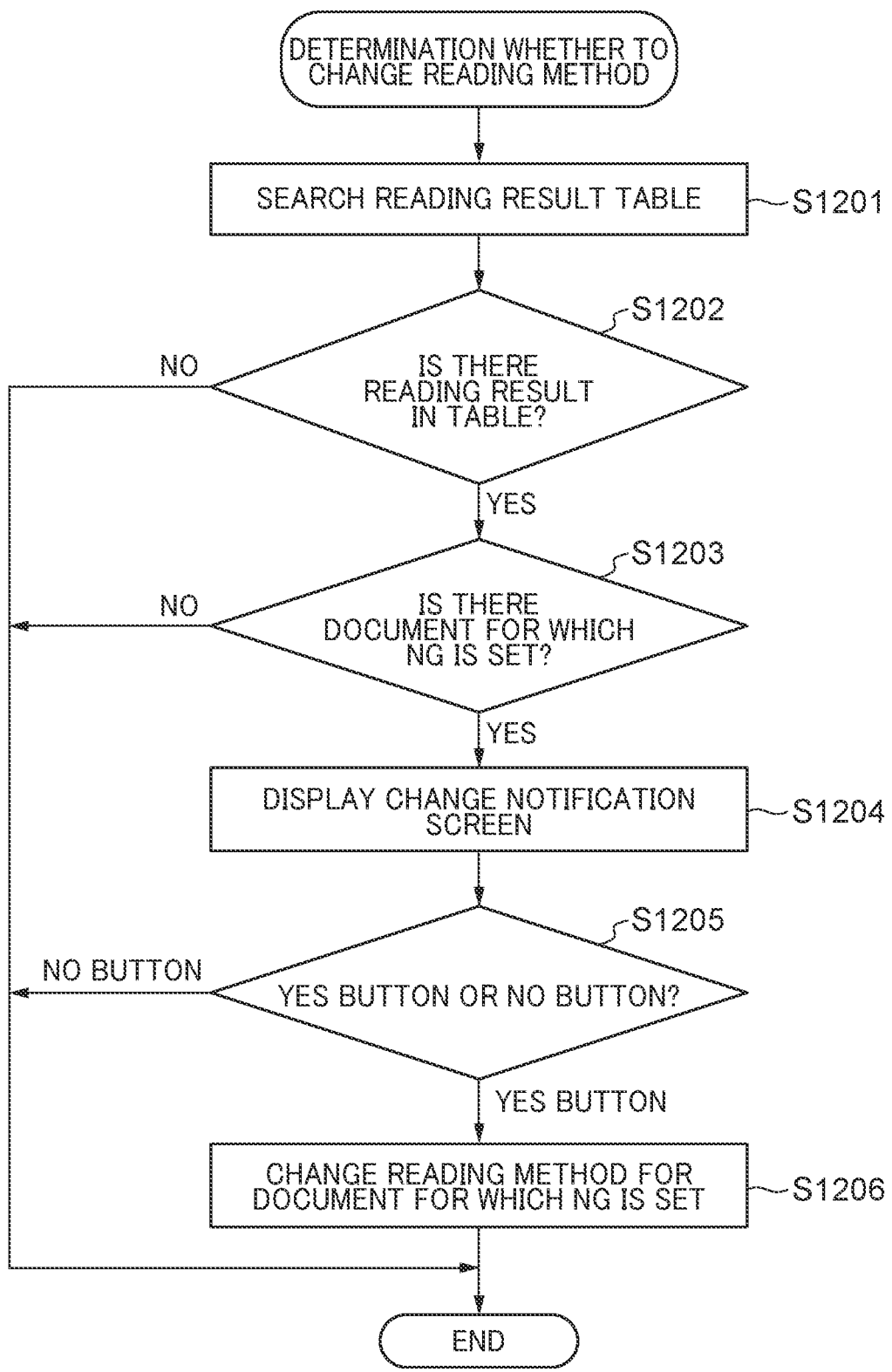
FIG. 12 is a flowchart illustrating a procedure of determination whether to change a reading method in step S1008 in FIG. 10A.

FIG. 12 is a flowchart illustrating a procedure of determination whether to change the reading method in step S1008 in FIG. 10A.

In FIG. 12, the CPU 102 searches the reading result table 1100 stored in the RAM 104 (step S1201). Specifically, the CPU 102 determines information associated with the patient ID of the patient selected in step S1006, in the reading result table 1100. Next, the CPU 102 determines whether or not the determined information includes the reading result 1104 (step S1202).

As a result of the determination in step S1202, in a case where the reading result 1104 is in the determined information, the CPU 102 determines whether or not there is a document for which NG is set as the reading result 1104 in the specified information (step S1203).

As a result of the determination in step S1203, in a case where there is a document (hereinafter, referred to as a "read failed document") for which NG is set as the reading result 1104 in the determined information, the CPU 102 causes the operation unit 109 to display the change notification screen 1300 illustrated in FIG. 13 (step S1204). Since the previous reading using the designated reading method has failed, the change notification screen 1300 indicates a message 1301 that asks a user whether or not to change the reading method. The change notification screen 1300 further indicates a "YES" button 1302 and a "NO" button 1303. The CPU 102 determines which of the "YES" button 1302 and the "NO" button 1303 has been pressed by the user (step S1205).

As a result of the determination in step S1205, in a case where the user presses the "YES" button 1302, the CPU 102 changes the reading method set for the read failed document in the designated document-set information (step S1206). For example, in a case where the "YES" button 1302 in the change notification screen 1300 indicating the message 1301 in FIG. 13 is pressed, the reading method is changed from "ADF" to "platen".

The CPU 102 ends the present processing, in a case where the reading result 1104 is not set in the determined information as a result of the determination in step S1202, in a case where there is no read failed document in the determined information as a result of the determination in step S1203, or in a case where the user presses the "NO" button 1303 as a result of the determination in step S1205.

According to the embodiment described above, in a case where an instruction to read again a document, of which the previous reading with the ADF 115 has failed, is received, the operation unit 109 displays the change notification screen 1300 that prompts a user to change the reading method set for the document based on the reading result table 1100 stored in the RAM 104. It allows a user to change the reading method for the document of which the previous reading with the ADF 115 has failed to another reading method in which the jam will not occur, preventing recurrence of a jam at the time of document reading.

In the embodiment described above, documents of a plurality of types are read in accordance with the document-set information in which "ADF" or "platen" is set as a reading method for each of the documents of a plurality of types having different document sizes, materials, weights, and the like, and in a case where reading fails due to occurrence of an ADF jam at the time of reading the documents, information indicating the failure in reading is recorded as the document-set information associated with the document. As a result, in the image processing apparatus 100 capable of reading documents of a plurality of types by different reading methods, it is possible to prevent recurrence of a jam at the time of document reading.

Furthermore, in the embodiment described above, according to an instruction to read all the documents placed (pressing of the reading start button 705), the image processing apparatus 100 reads all the documents placed, generates pieces of image data of the respective documents, and transmits the generated pieces of image data to the external device. As a result, in a job of reading documents of a plurality of types, generating image data of these, and transmitting the generated image data to an external device, it is possible to prevent recurrence of a jam at the time of document reading.

In the embodiment described above, the external device is the file storage 202 is given as an external device. This prevents recurrence of a jam at the time of document reading, in a system having the configuration such that pieces of image data of the read documents are managed in the file storage 202.

In the embodiment described above, the CPU 102 adds the identifier of the document-set information to the file name of each of the generated pieces of image data of the respective documents. As a result, the electronic medical record management apparatus 203 that has taken the pieces of image data from the file storage 202 can determine that some pieces of image data have been generated in the same routine work, and can collectively store the pieces of image data in the same folder when storing the pieces of image data in the file system in the electronic medical record management apparatus 203. As a result, document management is facilitated.

It should be noted that, in the embodiment described above, a case has been described in which, in a case where an instruction to read a document, of which the previous reading by the ADF 115 has failed, is received, the CPU 102 issues a notification to prompt a user to change the reading method setting from the ADF 115 to the platen 116, but the present invention is not limited to this. For example, in a case where an instruction to read a document, of which the previous reading with the platen 116 has failed, is received, the CPU 102 may issue a notification to prompt change the reading method setting from the platen 116 to the ADF 115.

In the embodiment described above, whether or not to activate the reading start button 705, which is an instruction unit that allows a user to input an instruction to read all the documents placed may be controlled based on the placement condition of documents corresponding to the designated document-set information.

For example, in an operation of registering image data of documents of a plurality of types having different document sizes, materials, weights, and the like as in the set for an initial examination described above, a user needs to set the documents on both the ADF 115 and the platen 116 before starting reading. At this time, if the user mistakenly presses the reading start button 705, forgetting to set some of the documents on the ADF 115 or the platen 116, image data of the documents forgotten to set on the ADF 115 or the platen 116 cannot be acquired. In order to prevent such forgetting of document placement, in the present embodiment, the CPU 102 may cause the operation unit 109 to indicate information 1401 of the placement condition of documents shown in FIG. 14 in a screen before the start of reading, specifically, the patient selection screen 704. Furthermore, in a case where both "ADF" and "platen" are set as the reading methods in the designated document-set information and no document is placed on at least one of the ADF 115 or the platen 116, the CPU 102 may deactivate the reading start button 705 so as not to receive pressing of the reading start button 705 by a user. At this time, the reading start button 705 indicated in the patient selection screen 704 may be grayed out as illustrated in FIG. 14, or may be hidden. On the other hand, in a case where both "ADF" and "platen" are set as the reading methods in the designated document-set information and documents are placed on both of the ADF 115 and the platen 116, the CPU 102 may activate the reading start button 705 so as to receive pressing of the reading start button 705 by a user. In this manner, by controlling whether or not to activate the reading start button 705 based on the placement condition of documents corresponding to the designated document-set information, it is possible to prevent reading from being started in a situation where placement of some of the documents are forgotten.

It should be noted that, in the embodiment described above, the configuration in which the image processing apparatus 100 performs the above processing alone has been described. However, the present invention is not limited to this configuration, and a system including a plurality of devices may perform the above processing.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   a document feeder capable of conveying a plurality of documents placed thereon;
   a document reader configured to read a document;
   a platen;
   a storage device; and
   one or more processors that cause the image processing apparatus to function as:
   a reading unit configured to cause the document reader to read a document by a reading method set among a plurality of reading methods including a conveyance-based reading method of reading a document conveyed from the document feeder;
   a storage control unit configured to, in a case where reading of a document with the document reader by the conveyance-based reading method has failed, store information on the document in the storage device;
   a notification unit configured to, in a case where an instruction to read again the document, of which the reading has failed, by the conveyance-based reading method is issued, issue, in accordance with the information, a notification that prompts to change the reading method set for the document; and
   an instruction unit,
   wherein the plurality of reading methods includes the conveyance-based reading method and a platen-based reading method of reading a document placed on the platen,
   wherein the reading unit causes the document reader to read documents of a plurality of types in accordance with document-set information in which the conveyance-based reading method or the platen-based reading method is set for each of the documents of the plurality of types, and
   wherein in a case where both the conveyance-based reading method and the platen-based reading method are set in the document-set information and documents are placed on both the document feeder and the platen, the instruction unit is configured to allow input of an instruction to read all the placed documents.

2. The image processing apparatus according to claim 1, wherein the one or more processors further cause the image processing apparatus to function as a transmission unit configured to transmit image data generated by the reading unit causing the document reader to read the placed documents, and in accordance with the instruction to read all the placed documents, the reading unit causes the document reader to read all the placed documents, and generates pieces of image data of all the respective placed documents, and the transmission unit transmits the generated pieces of image data of all the respective placed documents to an external device.

3. The image processing apparatus according to claim 2, wherein the reading unit adds an identifier of the document-set information to a file name of each of the generated pieces of image data of all the respective placed documents.

4. The image processing apparatus according to claim 2, wherein the external device is a file storage communicably connected to the image processing apparatus.

5. A method for controlling an image processing apparatus including a document feeder capable of conveying a plurality of documents placed thereon, a document reader configured to read a document, a platen, and a storage device, the method comprising:

causing the document reader to read a document by a reading method set among a plurality of reading methods including a conveyance-based reading method of reading a document conveyed from the document feeder;

in a case where reading of a document with the document reader by the conveyance-based reading method has failed, storing information on the document in the storage device; and in a case where an instruction to read again the document, of which the reading has failed, by the conveyance-based reading method is issued, issuing, in accordance with the information, a notification that prompts to change the reading method set for the document, wherein the plurality of reading methods includes the conveyance-based reading method and a platen-based reading method of reading a document placed on the platen, wherein the document reader is caused to read documents of a plurality of types in accordance with document-set information in which the conveyance-based reading method or the platen-based reading method is set for each of the documents of the plurality of types, and wherein in a case where both the conveyance-based reading method and the platen-based reading method are set in the document-set information and documents are placed on both the document feeder and the platen, input of an instruction to read all the placed documents is allowed.

6. A non-transitory computer-readable storage medium storing a program for causing a computer to execute a method for controlling an image processing apparatus, the image processing apparatus including a document feeder capable of conveying a plurality of documents placed thereon, a document reader configured to read a document, a platen, and a storage device, the method comprising:

causing the document reader to read a document by a reading method set among a plurality of reading methods including a conveyance-based reading method of reading a document conveyed from the document feeder;

in a case where reading of a document with the document reader by the conveyance-based reading method has failed, storing information on the document in the storage device; and in a case where an instruction to read again the document, of which the reading has failed, by the conveyance-based reading method is issued, issuing, in accordance with the information, a notification that prompts to change the reading method set for the document, wherein the plurality of reading methods includes the conveyance-based reading method and a platen-based reading method of reading a document placed on the platen, wherein the document reader is caused to read documents of a plurality of types in accordance with document-set information in which the conveyance-based reading method or the platen-based reading method is set for each of the documents of the plurality of types, and wherein in a case where both the conveyance-based reading method and the platen-based reading method are set in the document-set information and documents are placed on both the document feeder and the platen, input of an instruction to read all the placed documents is allowed.

* * * * *